United States Patent
Faure et al.

(10) Patent No.: US 7,709,300 B2
(45) Date of Patent: May 4, 2010

(54) STRUCTURE AND METHOD FOR PARTITIONED DUMMY FILL SHAPES FOR REDUCED MASK BIAS WITH ALTERNATING PHASE SHIFT MASKS

(75) Inventors: Thomas B. Faure, Milton, VT (US); Howard S. Landis, Underhill, VT (US); Jeanne-Tania Sucharitaves, Williston, VT (US)

(73) Assignee: International Business Machines Corporation, Armonk, NY (US)

(*) Notice: Subject to any disclaimer, the term of this patent is extended or adjusted under 35 U.S.C. 154(b) by 669 days.

(21) Appl. No.: 11/539,204

(22) Filed: Oct. 6, 2006

(65) Prior Publication Data

US 2008/0086714 A1    Apr. 10, 2008

(51) Int. Cl.
    *H01L 21/82*    (2006.01)
(52) U.S. Cl. ............... 438/129; 438/800; 257/E21.642
(58) Field of Classification Search ............ 438/4, 438/14, 618, 622, 926, 15, 129, 690, 694, 438/759, 800, 942, FOR. 459, FOR. 473; 430/5; 257/E21.642, E21.705; 716/19
    See application file for complete search history.

(56) References Cited

U.S. PATENT DOCUMENTS

| | | | | |
|---|---|---|---|---|
| 5,032,890 A | * | 7/1991 | Ushiku et al. | ............... 257/211 |
| 5,537,648 A | * | 7/1996 | Liebmann et al. | ............. 716/19 |
| 5,636,131 A | | 6/1997 | Liebmann et al. | |
| 5,763,955 A | | 6/1998 | Findley et al. | |
| 5,932,563 A | * | 8/1999 | Stokes et al. | ................ 514/108 |
| 6,057,063 A | | 5/2000 | Liebmann et al. | |
| 7,383,521 B2 | | 6/2008 | Smith et al. | |
| 2003/0106037 A1 | * | 6/2003 | Moniwa et al. | ............... 716/19 |
| 2003/0229875 A1 | * | 12/2003 | Smith et al. | .................... 716/10 |
| 2004/0110069 A1 | | 6/2004 | Lercel et al. | |
| 2005/0031972 A1 | | 2/2005 | Cote et al. | |
| 2005/0114824 A1 | | 5/2005 | Wang et al. | |
| 2005/0153212 A1 | | 7/2005 | Lavin et al. | |
| 2007/0166887 A1 | | 7/2007 | Chen et al. | |
| 2008/0086714 A1 | | 4/2008 | Faure et al. | |
| 2008/0203589 A1 | | 8/2008 | Bailey et al. | |
| 2009/0100399 A1 | | 4/2009 | Faure et al. | |

OTHER PUBLICATIONS

Lee et al, "Using Smart Dummy Fill and Selective Reverse Etchback for Pattern Density Equalization", Proc. CMP-MIC, Mar. 2000, pp. 255-258.*
Office Action in U.S. Appl. No. 11/872,924, dated Apr. 24, 2009.
Office Action dated Nov. 19, 2009 in U.S. Appl. No. 11/872,924.

* cited by examiner

*Primary Examiner*—Matthew Smith
*Assistant Examiner*—Quovaunda Jefferson
(74) *Attorney, Agent, or Firm*—Richard Kotulak; Greenblum & Bernstein P.L.C.

(57) ABSTRACT

A method and system for partitioned dummy fill shapes for reduced mask bias with alternating phase shift masks, or with other two-mask lithographic processes employing a trim mask. The method and system comprises locating regions in a finished semiconductor design that do not contain as-designed shapes. The method and system generates dummy fill shapes in the regions at a predetermined final density and sizes the generated dummy shapes so that their local density is increased to a predetermined value. The method and system further creates corresponding trim shapes that act to expose an oversized portion of the dummy shape, effectively trimming each dummy shape back to the predetermined final density. The method and system can be implemented on a computer program product comprising a computer useable medium including a computer readable program.

20 Claims, 7 Drawing Sheets

STRUCTURE AND METHOD FOR PARTITIONED DUMMY FILL SHAPES FOR REDUCED MASK BIAS WITH ALTERNATING PHASE SHIFT MASKS

FIELD OF THE INVENTION

The invention relates to a method and system for partitioned dummy fill shapes for reduced mask bias with alternating phase shift masks, or with other two-mask lithographic processes employing a trim mask.

BACKGROUND DESCRIPTION

Phase shift mask technology allows for much smaller features to be resolved for a given illumination wavelength than conventional Chrome-On-Glass or Attenuated Phase Shift methods. Typically small features are resolved by exposing the spaces on either side through alternating 0-degree and 180-degree phase-shifted openings on a phase mask. The ends of these fine features are normally trimmed by exposure through a second block mask, since it is 0-degree and 180-degree shapes are not normally allowed to touch one another. Large features that could be easily resolved without resorting to alternating phase shift methods are normally rendered by the block mask alone.

For polysilicon gate applications, these large features normally include large decoupling capacitors and dummy fill shapes, among others. Within macros containing a large number of critical gates, the local density of 0-degree and 180-degree shapes (openings in an otherwise opaque mask) is normally about 40-65%, while the density of block shapes (opaque regions in an otherwise clear mask) is normally 70-90%. In other regions of a design, such as otherwise-empty areas containing only dummy fill shapes, the local density of 0-degree and 180-degree shapes is nearly zero, and the density of block shapes is typically 25%. In peripheral areas containing mostly large decoupling capacitors, the 0-degree and 180-degree local density is nearly zero, and the density of block shapes is about 60-75%.

On technology development testsites, there are often companion chiplets surrounding a central product or product-like chip. For these companion chiplets, the local density of 0-degree and 180-degree shapes is very often also nearly zero, and the local density of block shapes, mostly dummy fill, is approximately 25%. As a result, the local density of 0-degree and 180-degree phase shapes varies widely across the phase shift reticle, particularly on large length scales (1 mm or larger). Similarly, the local density of block shapes varies widely across the block reticle, particularly on large length scales. Variations in the local density of shapes are known to have an adverse effect on the dimensional control of features on those masks, and these non-uniformities have been demonstrated to exhibit a strong adverse effect on the manufacturing mask bias for both phase and block reticles. Similar manufacturing difficulties arising from non-uniform density of shapes can adversely affect masks used in other two-mask lithographic processes incorporating an auxiliary trim mask, used for example to create closely-space line ends in an SRAM or other memory array.

Known solutions include a two-pass methodology for mask manufacture, wherein oversized features are trimmed in a second pass through the mask writer. This approach increases the cost and turnaround-time for the masks, has the potential to increase the defect density on those masks, and is inherently a one-way process only. That is, features that were rendered too large can be trimmed, but features that were originally rendered too small cannot be readily adjusted.

SUMMARY OF THE INVENTION

In a first aspect of the invention, a method comprises locating regions in a finished semiconductor design that do not contain as-designed shapes. The method generates dummy fill shapes in the regions at a predetermined final density and sizes the generated dummy shapes so that their local density is increased to a predetermined value. The method further creates corresponding trim shapes that act to expose an oversized portion of the dummy shape, effectively trimming each dummy shape back to the predetermined final density.

In another aspect of the invention, the method is provided for partitioned dummy fill shapes for reduced mask bias with alternating phase shift masks. The method comprises rendering mask patterns as dummy fill shapes partitioned across two masks. The shapes on a first mask are associated with dummy fill shapes which are expanded until their local density is in a desired range. Associated trim shapes on a second mask are used to trim the expanded dummy fill shapes to a desired size.

In further embodiments, the generated dummy shapes are sized on a block mask and, for each oversized dummy fill shape, corresponding trim shapes are created on a phase mask. In yet another aspect of the invention, a system comprising at least one of a hardware and software component is configured to perform the method steps of the invention.

DETAILED DESCRIPTION OF EMBODIMENTS OF THE INVENTION

The invention relates to a method and system for partitioned dummy fill shapes for reduced mask bias with alternating phase shift masks or other two-mask lithographic processes incorporating a trim mask. In an embodiment of the invention, mask patterns that are rendered as dummy fill shapes are partitioned across two masks, e.g., on a phase mask and a block mask, such that the local density of shapes on both masks can be made significantly more uniform. Specifically, in embodiments, the shapes on the block mask associated with dummy fill are expanded until their local density is in the desired range (e.g., typically 70-90%), and associated trim shapes on the phase mask are used to trim the oversized (expanded) block shapes to their desired size. In this manner, regions containing dummy fill shapes, such as spaces between dense circuit macros, and companion chiplets on a technology development testsite, will exhibit local densities on both the phase mask and block mask that are closer to the densities exhibited by circuit regions containing mostly small, critical features such as SRAM or other memory arrays, or general-purpose logic circuitry.

Figure 1:
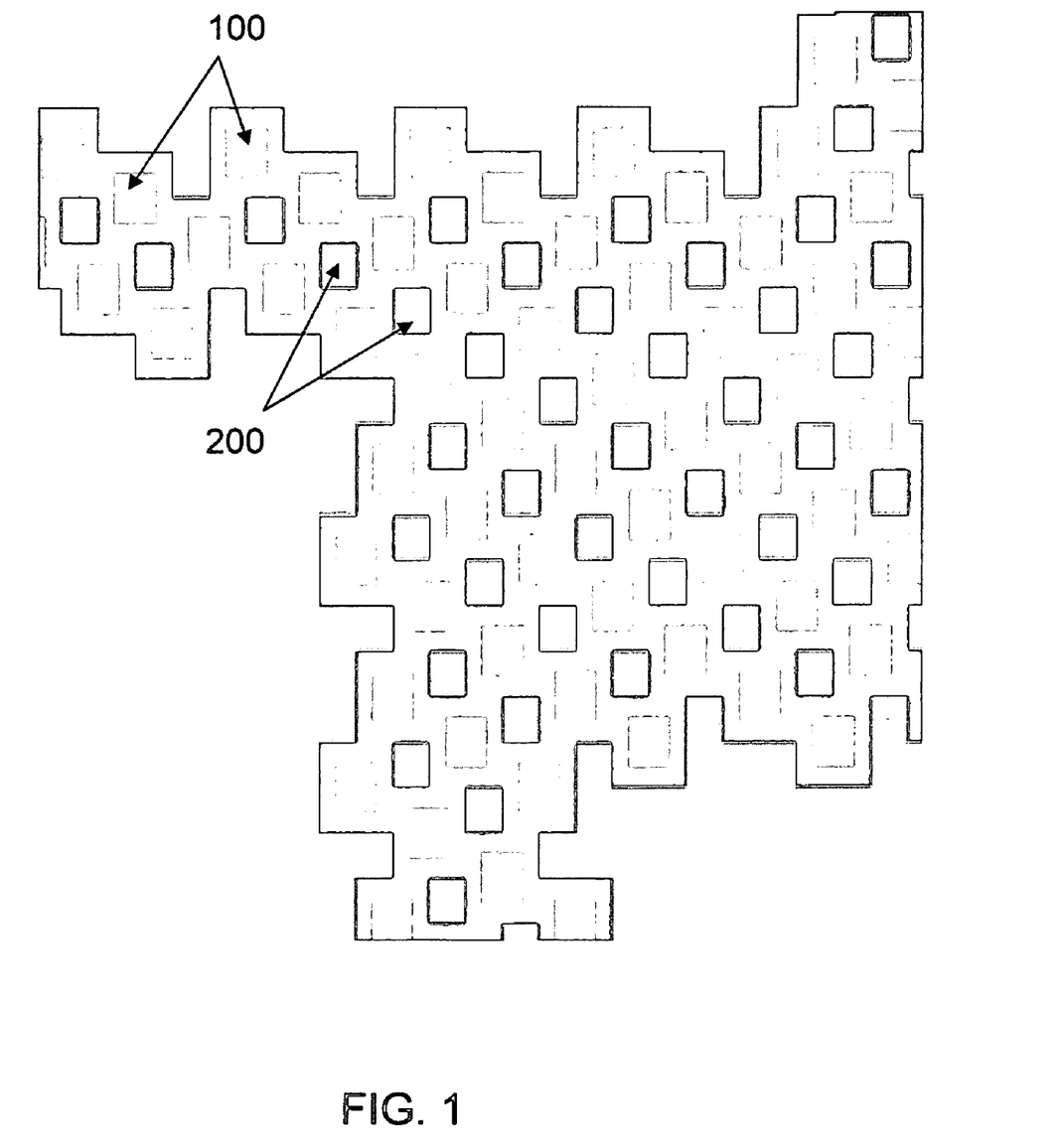
FIG. 1 shows an illustrative example of 25%-density dummy fill shapes constructed as 80%-dense oversized features.

Referring to FIG. 1, as an example, 25%-density dummy fill shapes are constructed as 80%-dense oversized features, and trimmed back to their standard size by 55%-dense 0-degree and/or 180-degree dummy trim shapes. More specifically, in FIG. 1, oversized dummy fill shapes 100 for the phase mask are oversized to reach the desired local density, in this case 80%. With this arrangement of dummy fill shapes 100, adjacent shapes abut at 80% local density. Donut-shaped dummy 0-degree and/or 180-degree dummy shapes 200 are used to trim the oversized dummy fill shapes back to their desired final density. Other arrangements of dummy fill shapes that are commonly used in the industry, such as square or rectangular dummy shapes, can be oversized and trimmed in the manner described in accordance with the invention.

Figure 2:
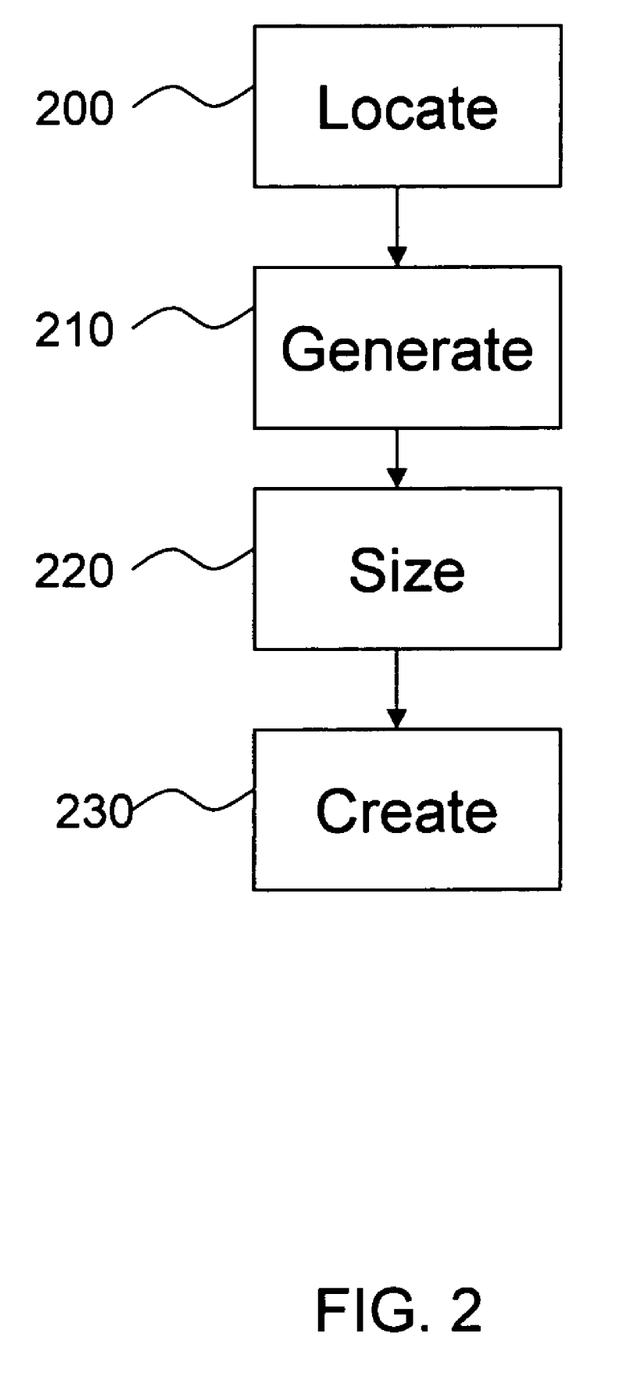
FIG. 2 is a flow diagram implementing steps of the invention.

FIG. 2 is a flow diagram implementing steps of the invention. FIG. 2 may equally be a high level block diagram implementing the steps thereof. The steps of FIG. 2 may be implemented and executed in the environment of FIG. 1. Additionally, the invention can take the form of an entirely hardware embodiment, an entirely software embodiment or an embodiment containing both hardware and software elements. In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The medium can be an electronic, magnetic, optical, electromagnetic, infrared, or semiconductor system (or system or device) or a propagation medium, all of which are known to those of skill in the art.

Referring back to FIG. 2, at step 200, the process locates regions in a finished semiconductor design that do not contain as-designed shapes on levels of interest. These regions are available for dummy fill shapes. In these regions, at step 210, the process generates dummy fill shapes at a desired (predetermined) final density (e.g., about 25%) in a manner known to those of skill in the art. (See, FIG. 3.)

At step 220, the process sizes all of the generated dummy shapes so that their local density is increased to the desired value (e.g., about 80%). (See, FIG. 4.) The dummy fill shapes should have sufficient spacing from functional shapes to allow the expansions to take place without encroaching on the as-designed functional shapes. For example, sufficient spacing encompasses the dummy shapes not touching or otherwise coming too close to functional features as a result of the expansion in FIG. 4. Too close is normally specified as part of the general rules for acceptable placement of dummy fill shapes. These expanded shapes are rendered on the block mask. At step 230, for each oversized dummy fill shape, the process creates corresponding trim shapes that act to expose the oversized portion of the dummy shape, effectively trimming each dummy shape back to the desired final density (about 25%). In one non-limiting example, the local density of dummy 0-degree and/or 180-degree dummy-trim shapes is about 55%. (See, FIG. 5). These shapes are rendered on the phase mask.

Figure 5:
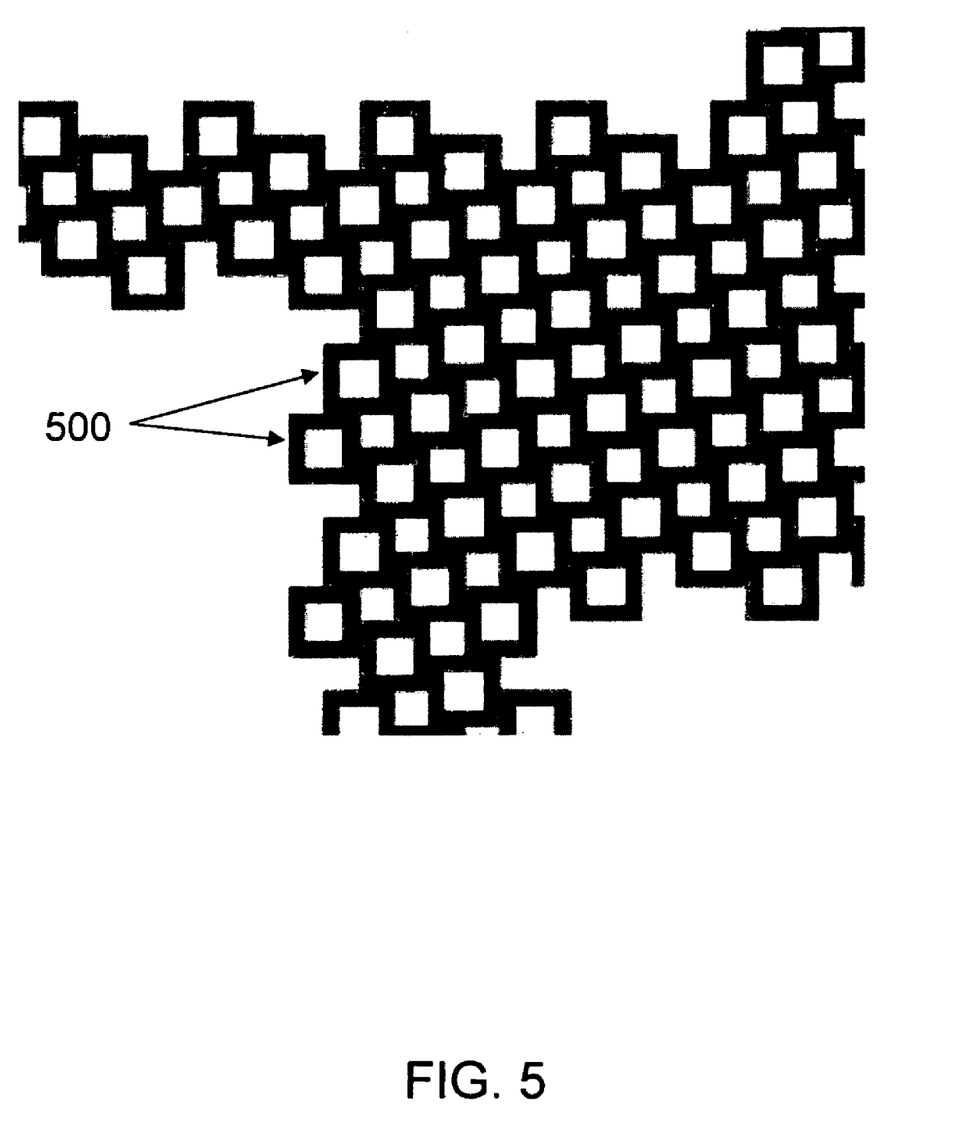
FIG. 5 graphically represents dummy-trim shapes in accordance with the invention.

In embodiments, the edges of the dummy trim shapes can be coincident with the edges of the dummy block shapes that they act upon, or the trim shapes can extend beyond (overlap) the edges of the dummy block shapes. In embodiments, the overlap can be as large or as small as may useful in achieving the desired densities for each mask. Tautologically, the overlap can be as small as zero—no overlap—or fully as large as the smaller of the dummy shape of the trim shape, for example. This overlap can increase the acceptable process window for misalignment between the two masks, and can also increase the local density of 0-degree and/or 180-degree trim shapes, independent of the local density of dummy shapes on the block mask. This fine-tuning of the phase and block densities is helpful in adjusting the total exposure for small local regions, as the local dose can have a strong effect on lithographic bias.

Figure 3:
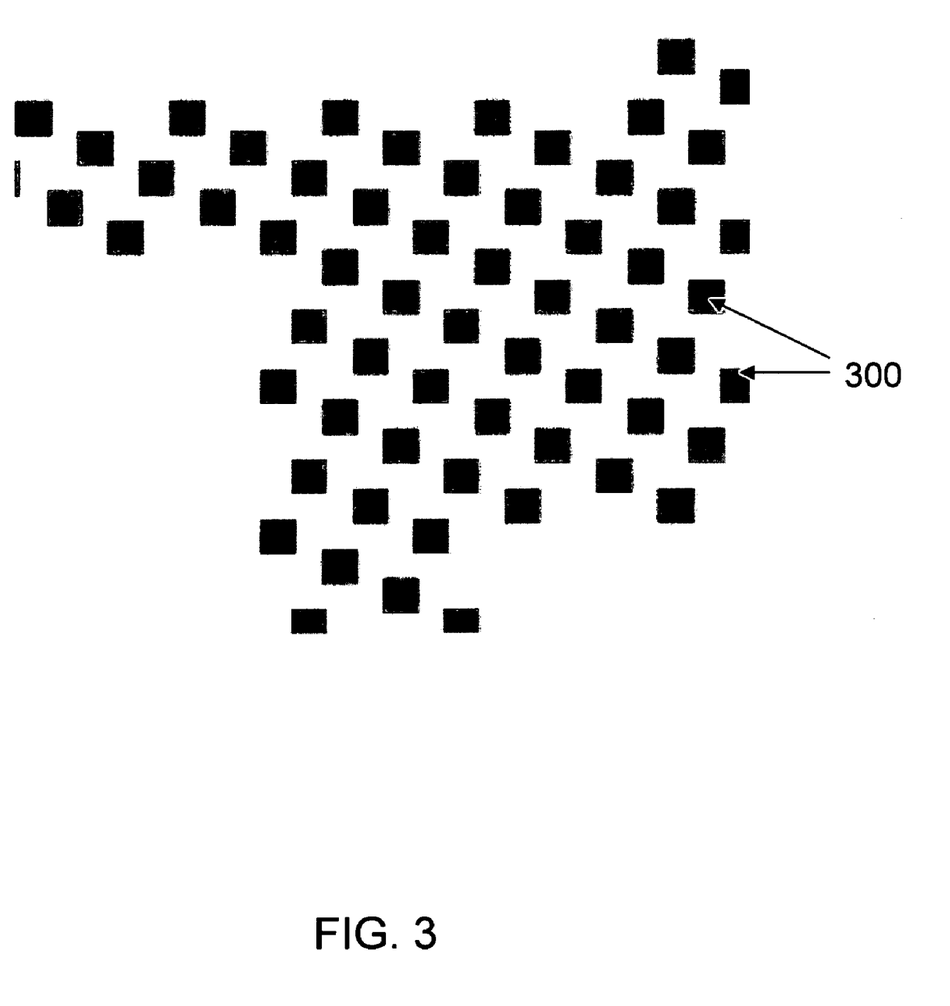
FIG. 3 graphically represents dummy fill shapes in accordance with the invention.

FIG. 3 shows regions 300 that are available for dummy fill shapes. In these regions 300, the process generates dummy fill shapes at the desired final density (e.g., about 25%) in a manner known to those of sill in the art. As discussed above, the dummy fill shapes have sufficient spacing from functional shapes to allow the expansions to take place without significantly encroaching on the as-designed functional shapes.

Figure 4:
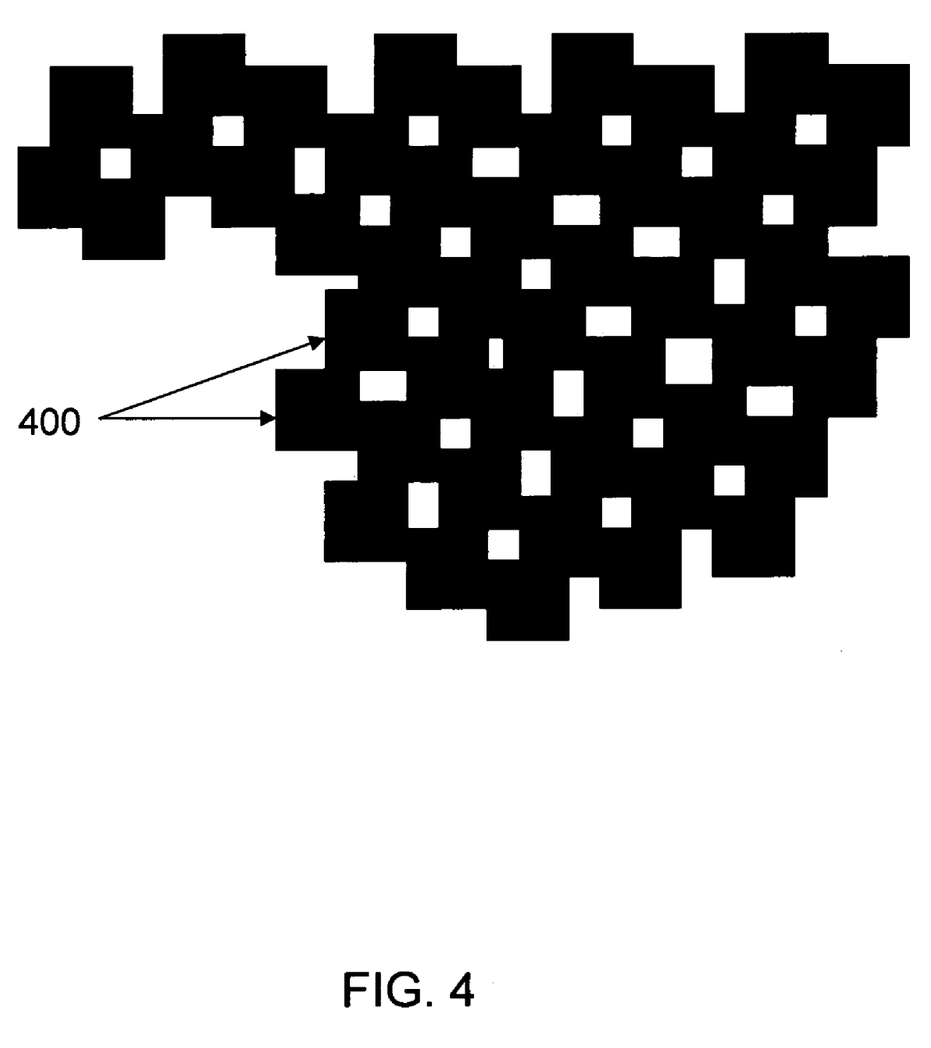
FIG. 4 graphically represents dummy fill shapes in accordance with the invention.

FIG. 4 shows oversized dummy fill shapes 400 in accordance with the invention. As previously discussed, the process of the invention sizes all of the generated dummy shapes so that their local density is increased to the desired value (e.g., about 80%).

FIG. 5 shows dummy fill shapes 500 in the phase mask. In one non-limiting example, the local density of dummy 0-degree and/or 180-degree dummy-trim shapes is about 55%. It should be understood, though, that the local density of dummy 0-degree and/or 180-degree dummy-trim shapes can be other percentages.

Figure 6:
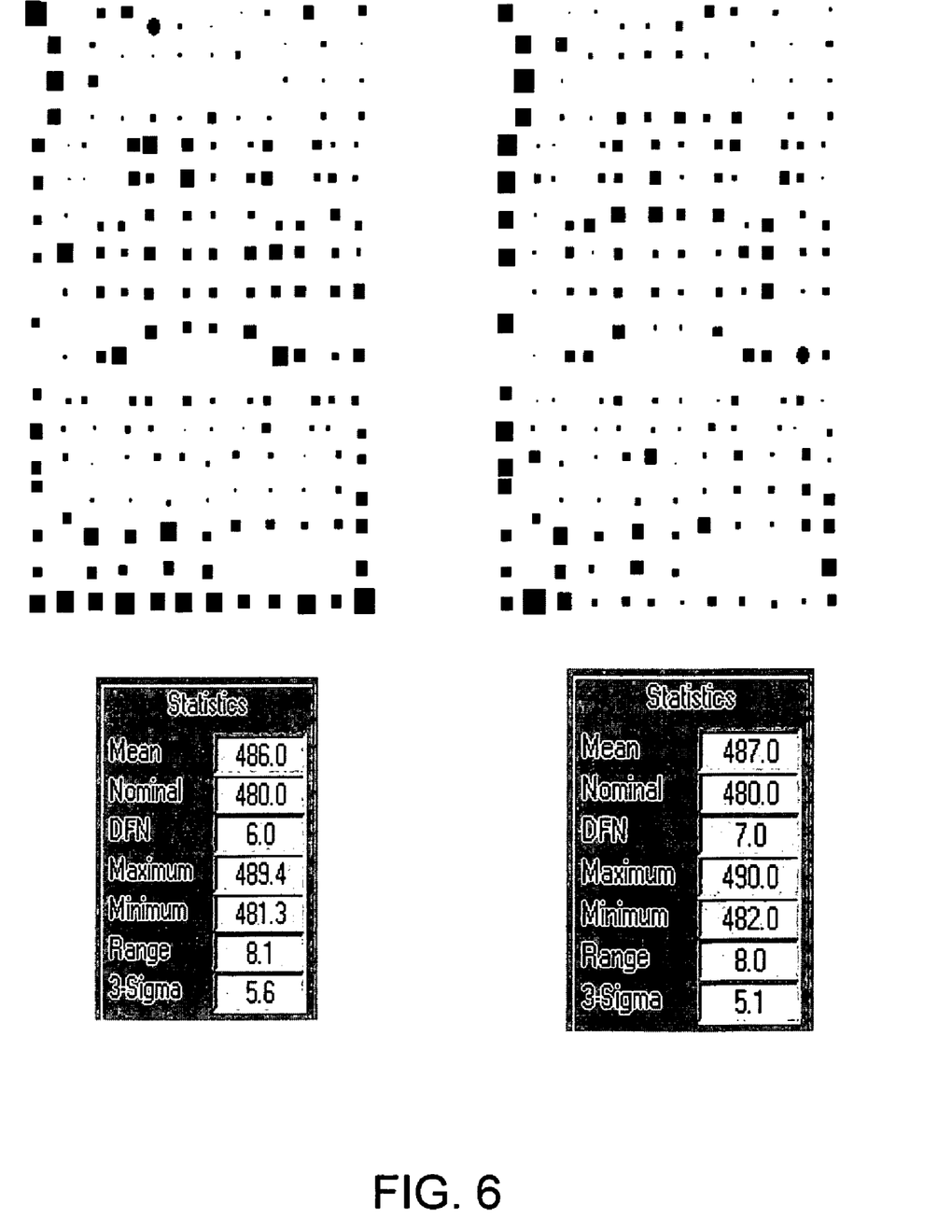
FIG. 6 graphically shows a decrease in the block mask bias in accordance with the invention.

The structures and methods in this disclosure can be applied to any semiconductor level that is rendered by alternating phase shift methods, and is not limited to a polysilicon gate level which is one illustrative example. Additionally, the approach described herein has been shown to decrease the block mask bias by 50%, as shown experimentally in FIG. 6. More specifically, as shown in FIG. 6, the new fill has about 80% overetch and about 60% duty cycle during overetch.

Figure 7:
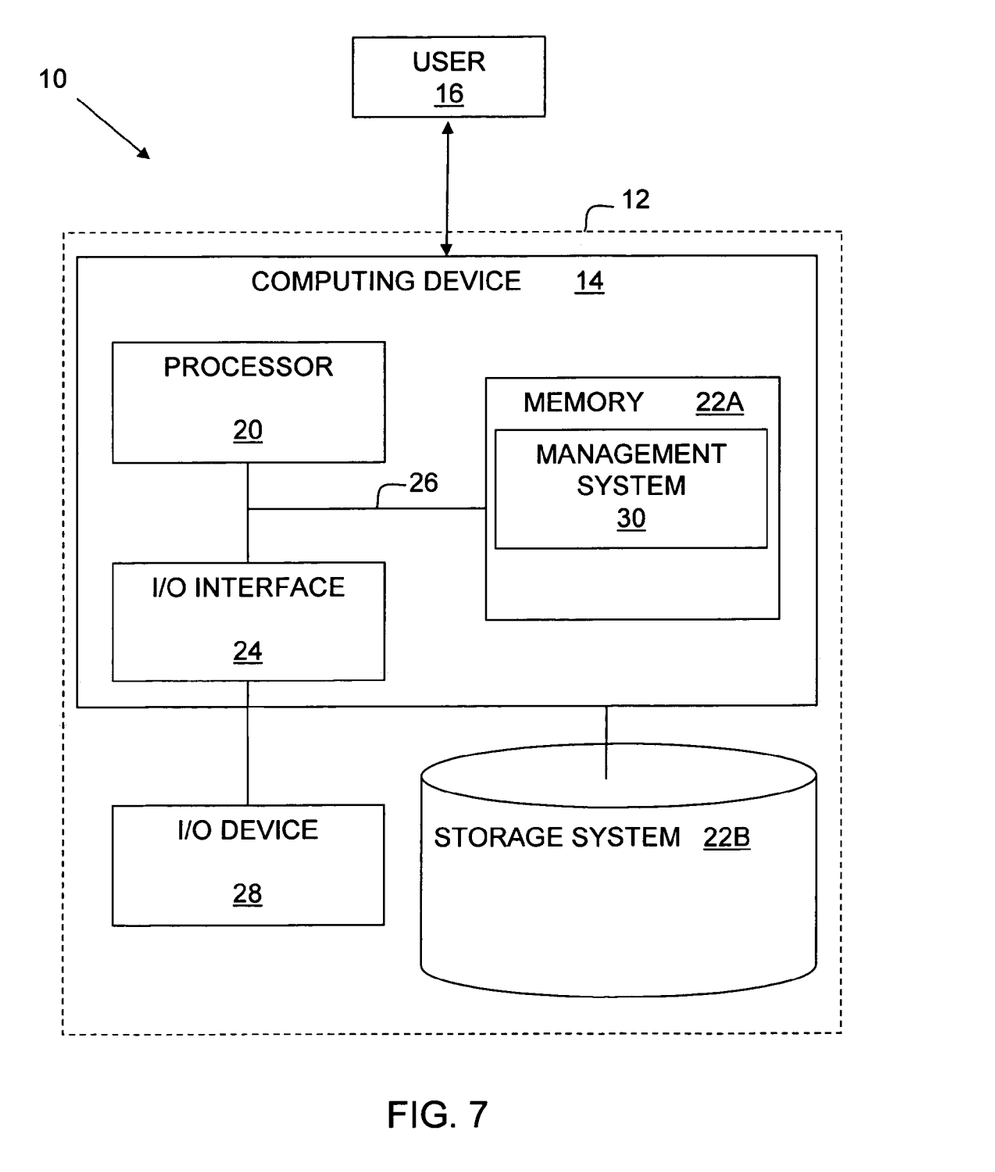
FIG. 7 is representative of a system implementing the invention.

FIG. 7 shows an illustrative environment 10 for managing and applying the processes in accordance with the invention. To this extent, the environment 10 includes a computer infrastructure 12 that can perform the processes described herein. In particular, the computer infrastructure 12 is includes a computing device 14 operable to perform the processes described herein. The computing device 14 is shown including a processor 20, a memory 22A, an input/output (I/O) interface 24, and a bus 26. Further, the computing device 14 is shown in communication with an external I/O device/resource 28 and a storage system 22B. The processor 20 executes computer program code, which is stored in memory 22A and/or storage system 22B. While executing computer program code, the processor 20 can read and/or write data, such as the required information to generate and trim dummy fill shapes, in accordance with the invention. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). In embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Additionally, the method as described herein is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A method comprising:
   locating regions in a finished semiconductor design that do not contain as-designed shapes;
   generating dummy fill shapes in the regions at a predetermined final density;
   expanding the generated dummy fill shapes so that their local density is increased to a predetermined value; and
   creating corresponding trim shapes to the expanded dummy fill shapes that act to expose an oversized portion of the expanded dummy fill shapes, effectively trimming each expanded dummy fill shape back to the predetermined final density.

2. The method of claim 1, wherein the as-design shapes are on levels of interest.

3. The method of claim 1, wherein the regions are available for the dummy fill shapes.

4. The method of claim 1, wherein the dummy fill shapes have a spacing from functional shapes to allow expansions to take place without encroaching on the as-designed shapes.

5. The method of claim 1, wherein the sizing the generated dummy fill shapes is rendered on a block mask.

6. The method of claim 1, wherein the creating step is performed for each oversized dummy fill shape of the dummy fill shapes.

7. The method of claim 1, wherein the predetermined final density is approximately 25% and a local density of dummy 0-degree and/or 180-degree dummy-trim shapes is about 55%.

8. The method of claim 1, wherein the trim shapes are rendered on a phase mask.

9. The method of claim 1, wherein one of:
   edges of the trim shapes are coincident with edges of the dummy fill shapes that they act upon; and
   the trim shapes overlap edges of the dummy fill shapes.

10. A method comprising:
    locating regions in a finished semiconductor design that do not contain as-designed shapes;
    generating dummy fill shapes in the regions at a predetermined final density;
    sizing the generated dummy fill shapes so that their local density is increased to a predetermined value; and
    creating corresponding trim shapes to the dummy fill shapes that act to expose an oversized portion of the dummy fill shapes, effectively trimming each dummy fill shape back to the predetermined final density,
    wherein one of:
       edges of the trim shapes are coincident with edges of the dummy fill shapes that they act upon; and
       the trim shapes overlap edges of the dummy fill shapes, and
    wherein the overlap increases acceptable process window for misalignment between two masks and increases local density of 0-degree and/or 180-degree trim shapes, independent of the local density of dummy shapes on a block mask of the two masks.

11. A method for partitioned dummy fill shapes for reduced mask bias with alternating phase shift masks comprising rendering mask patterns as dummy fill shapes partitioned across two masks, wherein shapes on a first mask associated with dummy fill are expanded until their local density is in a desired range and associated trim shapes on a second mask are used to trim the expanded dummy fill shapes to a desired size.

12. The method of claim 11, wherein (i) the first mask is a block mask and the second mask is a phase mask or (ii) the first mask is a primary mask and the second mask is a trim mask.

13. The method of claim 11, wherein the desired range is about 70% to 90%.

14. The method of claim 11, further comprising locating regions in a finished semiconductor design that do not contain as-designed shapes;
    generating the dummy fill shapes in the regions at a predetermined final density;
    sizing the generated dummy fill shapes on the block mask so that their local density is increased to the desired value; and
    creating, for each oversized dummy fill shape, corresponding trim shapes on the phase mask that act to expose an oversized portion of the dummy fill shape, effectively trimming each dummy shape back to the predetermined final density.

15. The method of claim 14, wherein the dummy fill shapes have a spacing from functional shapes to allow expansions to take place without encroaching on the as-designed shapes.

16. The method of claim 14, wherein the dummy fill shapes have a spacing from functional shapes to allow expansions to take place without encroaching on as-designed functional shapes.

17. The method of claim 14, wherein the predetermined final density is approximately 25% and a local density of dummy 0-degree and/or 180-degree dummy-trim shapes is about 55%.

18. The method of claim 14, wherein one of:
    edges of the dummy trim shapes are coincident with edges of dummy block shapes that they act upon; and
    the trim shapes overlap edges of the dummy block shapes.

19. The method of claim 18, wherein the overlap increases acceptable process window for misalignment between the two masks and increases local density of 0-degree and/or 180-degree trim shapes, independent of the local density of dummy shapes on a block mask.

20. A system comprising at least one of a hardware and software component configured to:

locate regions in a finished semiconductor design that do not contain as-designed shapes;

generate dummy fill shapes in the regions at a predetermined final density;

expand the generated dummy fill shapes so that their local density is increased to a predetermined value;

create corresponding trim shapes that act to expose an oversized portion of the expanded dummy fill shape, effectively trimming each expanded dummy fill shape back to the predetermined final density.

* * * * *